United States Patent
Frankel

(10) Patent No.: US 8,306,440 B2
(45) Date of Patent: Nov. 6, 2012

(54) POLARIZATION DIVERSITY RECEIVER SYSTEMS AND METHODS WITH POLARIZATION MODE DISPERSION MITIGATION

(75) Inventor: Michael Y. Frankel, Baltimore, MD (US)

(73) Assignee: Ciena Corporation, Hanover, MD (US)

(*) Notice: Subject to any disclaimer, the term of this patent is extended or adjusted under 35 U.S.C. 154(b) by 605 days.

(21) Appl. No.: 12/537,059

(22) Filed: Aug. 6, 2009

(65) Prior Publication Data

US 2011/0033195 A1    Feb. 10, 2011

(51) Int. Cl.
H04B 10/06 (2006.01)
(52) U.S. Cl. .................................. 398/211; 398/208
(58) Field of Classification Search ............ 398/208, 398/211
See application file for complete search history.

(56) References Cited

U.S. PATENT DOCUMENTS

| | | | |
|---|---|---|---|
| 7,076,169 B2 * | 7/2006 | Shpantzer et al. | 398/76 |
| 7,209,670 B2 | 4/2007 | Fludger et al. | |
| 2009/0074428 A1 * | 3/2009 | Liu | 398/208 |
| 2009/0142077 A1 * | 6/2009 | Taylor | 398/208 |
| 2009/0214224 A1 * | 8/2009 | Cho et al. | 398/188 |
| 2012/0002977 A1 * | 1/2012 | Hueda et al. | 398/149 |

OTHER PUBLICATIONS

L. E. Nelson, S. L. Woodward, M. D. Feuer, X. Zhou, P. D. Magill, S. Foo, D. Hanson, D. McGhan, H. Sun, H. Moyer, M. O'Sullivan; "Performance of a 46-Gbps Dual-Polarization QPSK Transceiver in a High-PMD Fiber Transmission Experiment"; OFC/NFOEC 2008 (c)Optical Society of America.

* cited by examiner

*Primary Examiner* — Nathan Curs
(74) *Attorney, Agent, or Firm* — Clements Bernard PLLC; Christopher L. Bernard; Lawrence A. Baratta, Jr.

(57) ABSTRACT

The present disclosure relates to polarization diversity receiver systems and methods with polarization mode dispersion mitigation through processing. Specifically, the present invention includes a direct-detection receiver system that removes the requirement for a LO and an ADC thereby improving power, size, and cost over existing solutions, while at the same time allowing sufficient electronic processing to mitigate PMD impairment. The present invention can be realized in a processing block in CMOS technology front-ended with a polarization diversity receiver utilizing a 90 deg. optical hybrid.

17 Claims, 14 Drawing Sheets

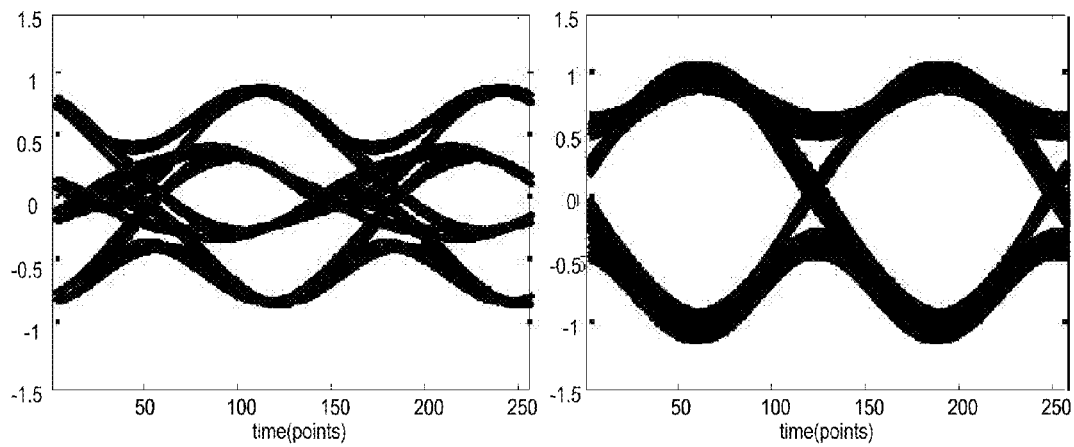
*FIG. 15*  *FIG. 16*

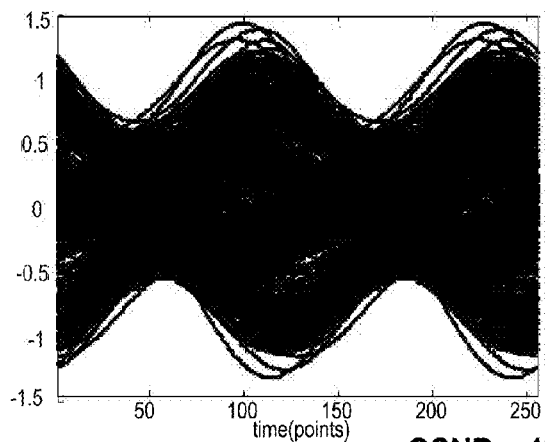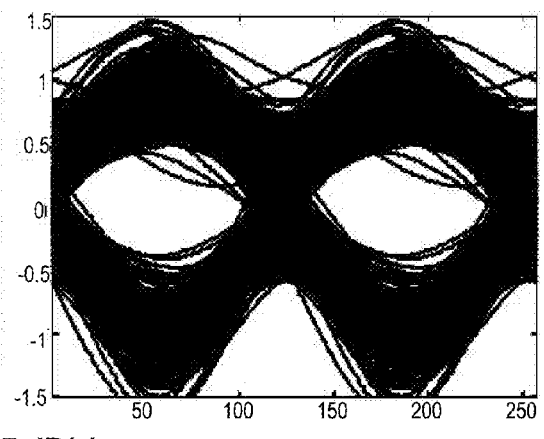
OSNR = 17 dB/.1nm
FIG. 18        FIG. 19

POLARIZATION DIVERSITY RECEIVER SYSTEMS AND METHODS WITH POLARIZATION MODE DISPERSION MITIGATION

FIELD OF THE INVENTION

The present invention relates generally to fiber-optic communication networks. More particularly, the present invention relates to polarization diversity receiver systems and methods with polarization mode dispersion mitigation through processing.

BACKGROUND OF THE INVENTION

Fiber-optic communication networks are experiencing rapidly increasing growth in capacity. This capacity growth in fiber-optic networks is generally addressed through advanced modulation formats, higher channel data rates, and/or decreased frequency spacing. Capacity growth is placing a substantial burden on communication systems, primarily in the following two areas. First, increasing optical channel data rates suffers from increasing penalties due to linear impairments, such as amplified stimulated emission (ASE) noise, group velocity dispersion (GVD) and polarization mode dispersion (PMD). ASE is an intrinsic property of the optical amplifier chain, and can be controlled by amplifier design and spacing. GVD is a largely static effect, and has a variety of excellent compensation strategies, including dispersion compensating fiber or gratings, dynamically tunable optical etalons, etc. However, PMD is a rapidly varying dynamic effect and is quite difficult to mitigate. Second, tight frequency spacing of high data rate channels leads to increasing nonlinear cross-talk effects. In particular, cross-phase modulation (XPM) is the more dominant impairment in dense wavelength division multiplexed (DWDM) systems on most conventional fiber types.

Conventional approaches to PMD compensation have generally focused on several areas, such as, (1) Optical PMD compensators based on fast optical polarization tracking, with subsequent optical relative delay (C. Xie, et al, "Automatic optical PMD compensator for 40-Gb/s DBPSK and DQPSK with fast changing SOP and PSP," ECOC 2008 Proceedings, paper We.3.E.5); (2) Optical PMD compensators based on integrated planar Lightwave circuits to implement the optical filtering required to approximate a response inverse to one generated by fiber PMD (M. Secondini, "Optical equalization: system modeling and performance evaluation," J. Lightwave Techn., vol. 24, no. 11, November 2006, pp. 4013-4021); (3) Direct-detection receivers, with subsequent compensation based on electronic feed-forward equalizer (FFE) and decision-feedback equalizer (DFE) structures or maximum likelihood sequence estimator (MLSE) estimation (C. Xie, et al, "Performance evaluation of electronic equalizers for dynamic PMD compensation in systems with FEC," OFC 2007 Proceedings, paper OTuA7); (4) Direct-detection receivers with polarization diversity based on selection of best polarization signal (A. O. Lima, et al, "A novel polarization diversity receiver for PMD mitigation," IEEE Photon. Techn. Lett., vol. 14, no. 4, April 2002, pp. 465-467); (5) Coherent receivers that allow full E-field capture, with subsequent digital processing of acquired data to remove PMD effects (E. Ip, et al, "Digital equalization of chromatic dispersion and polarization mode dispersion," J. Lightwave Techn., vol. 25, no. 8, August 2007, pp. 2033-2043); and differential receivers with E-field reconstruction capability that also utilize subsequent digital processing to remove PMD effects (X. Liu, "DSP-enhanced differential direct-detection for DQPSK and m-ary DPSK," ECOC 2007 proceedings, paper 7.2.1).

Optical PMD compensators based on fast optical polarization tracking, with subsequent optical relative delay have several disadvantages. For example, devices used for fast polarization tracking are based on large and expensive lithium niobate ($LiNbO_3$) polarization transformers (i.e., approximately 1 cm×10 cm long brass packaged devices). LiNbO3 polarization transformers require multi-stage control (e.g., five to eight stages) with very high voltages (i.e., in 50-70 V) range, and nanosecond speeds, thereby producing very high associated driver cost and power consumption. Also, differential delays are generally not tunable, and thus two or more stages of PMD compensation may be required to achieve both high range and good precision at the same time. Optical PMD compensators based on integrated planar Lightwave circuits solves the size and cost constraint, but PLC circuit filters are generally thermally tunable. Thus, their response speed is not sufficient to deal with the fast PMD changes observed in fielded systems.

Coherent receivers that allow full E-field capture are excellent for dealing with PMD impairments. Their primary drawbacks include requiring an additional optical local oscillator (LO) laser thereby increasing cost, size, and power. Coherent receivers also require an extremely high performance analog-digital converter (ADC) front end required to digitize four channels (I and Q for both polarizations). These converters typically operate at 2×data symbol rate, and need approximately six bit resolution to provide good signal representation. Thus, a 40 Gbps data channel would need ADCs operating at approximately 22 Gsamples/s, which are hard to realize and consume several Watts of power. Finally, digital signal processing has to continuously operate on very high data rate signals. These require massive parallelization in today's complementary metal oxide semiconductor (CMOS) process, and again consume many Watts of power. Further, E-field reconstruction approaches alleviate coherent LO laser needs, but still require complex and power-hungry ADCs and DSPs, similar to the Coherent receiver approach.

BRIEF SUMMARY OF THE INVENTION

In various exemplary embodiments, the present invention relates to polarization diversity receiver systems and methods with polarization mode dispersion mitigation through processing. Specifically, the present invention includes a direct-detection receiver system that removes the requirement for a LO and an ADC thereby improving power, size, and cost over existing solutions, while at the same time allowing sufficient electronic processing to mitigate PMD impairment. The present invention can be realized in a processing block in CMOS technology front-ended with a polarization diversity receiver utilizing a 90 deg. optical hybrid.

In an exemplary embodiment of the present invention, a receiver system includes a polarization diversity receiver configured to provide full electric field capture of a received optical signal; and an electrical processing block configured to receive the full electric field from the polarization diversity receiver and to perform polarization mode dispersion (PMD) mitigation by mapping polarizations associated with PMD Principal States of Polarization with a corresponding time-domain electric field, wherein the polarizations are denoted as a slow state and a fast state. The receiver system further includes a first variable delay configured to advance the slow state responsive to instantaneous differential group delay; and a second variable delay configured to delay the fast state responsive to the instantaneous differential group delay. The receiver system further includes a summation block configured to combine outs from the first variable delay and the second variable delay. The first variable delay, the second variable delay, and the summation block are located in the electrical processing block, and wherein the electrical processing block includes a complementary metal oxide semiconductor. The receiver system operates without a local oscillator and without an analog-to-digital converter. The electrical processing block executes a Least Mean Squared algorithm to determine coefficients associated with the mapping of polarizations, and to multiply inputs from the polarization diversity receiver by the coefficients. The polarization diversity receiver receives an input optical field with arbitrary polarization, and wherein the polarization diversity receiver includes a splitter that makes two copies of the input optical field and a 90° optical hybrid. Polarization terms of the input optical field are combined to provide both direct polarization terms and cross-polarization terms, and where the direct polarization terms and the cross-polarization terms are provided to the electrical processing block. The input optical field includes multiplexed signals on a horizontal polarization and a vertical polarization, and wherein the polarization diversity receiver comprises a polarization beam splitter configured to separate the horizontal polarization and the vertical polarization. The mapping for the slow state and the fast state is performed as:

$$\begin{pmatrix} e_s \\ e_f \end{pmatrix} = \begin{pmatrix} u & v \\ -v^* & u^* \end{pmatrix} \begin{pmatrix} e_h \\ e_v \end{pmatrix}$$

$$e_{s1} \cdot e_{s2}^* = (ue_{h1} + ve_{v1}) \cdot (u^* e_{h2}^* + v^* e_{v2}^*)$$

$$e_{s1} \cdot e_{s2}^* = uu^* e_{h1} e_{h2}^* + vv^* e_{v1} e_{v2}^* + uv^* e_{h1} e_{v2}^* + vu^* e_{v1} e_{h2}^*$$

$$e_{f1} \cdot e_{f2}^* = vv^* e_{h1} e_{h2}^* + uu^* e_{v1} e_{v2}^* - uv^* e_{h1} e_{v2}^* - vu^* e_{v1} e_{h2}^*$$

where $e_s$ corresponds to the slow state, $e_f$ corresponds to the fast state, $e_{s1}$ and $e_{s2}$ are identical copies of $e_s$, $e_{f1}$ and $e_{f2}$ are identical copies of $e_f$, * denotes a complex conjugate, and corresponds uu, vv, uv and vu are coefficients determined via dynamic adaptation using a Least Mean Squared algorithm. The input optical field is recovered with polarization mode dispersion mitigation and demodulated using:

$$e_{x1} \cdot e_{x2}^* (e_{s1} \cdot e_{s2}^*) \otimes \delta(t+\tau/2) + (e_{f1} \cdot e_{f2}^*) \otimes \delta(t-\tau/2).$$

In another exemplary embodiment of the present invention, a method includes receiving an optical signal time-domain electric field; creating a copy of the time-domain electric field; mapping the time-domain electric field and the copied time-domain electric field to polarizations associated with polarization mode dispersion principal states of polarizations (PSP); and mitigating the polarization mode dispersion based on the mapping step. The mitigating step includes determining coefficient values in the mapping step via dynamic adaptation using a Least Mean Squared algorithm; and determining a time-domain electric field for a fast PSP state and for a slow PSP state. The mitigating step further includes applying a relative delay to the time-domain electric field for the fast PSP state and for the slow PSP state based on instantaneous differential group delay; and recovering the optical signal with mitigated polarization mode dispersion by summing the delayed fast PSP state and the delayed slow PSP state.

In yet another exemplary embodiment of the present invention, a processing block for a receiver includes circuitry with an input and an output; wherein the input is configured to receive time-domain electric fields corresponding to a received optical signal; wherein the output is configured to provide a polarization mode dispersion mitigated signal of the received optical signal; wherein the circuitry is configured to map the received time-domain electric fields to polarizations associated with polarization mode dispersion principal states of polarization; and wherein the polarizations are denoted as a slow state and a fast state. The circuitry is further configured to: provide a first variable delay to advance the slow state responsive to instantaneous differential group delay; and provide a second variable delay to delay the fast state responsive to the instantaneous differential group delay. The circuitry is further configured to: sum outputs from the first variable delay and the second variable delay. The circuitry includes a complementary metal oxide semiconductor. The circuitry is utilized in a receiver operating without a local oscillator and without an analog-to-digital converter.

BRIEF DESCRIPTION OF THE DRAWINGS

The present invention is illustrated and described herein with reference to the various drawings, in which like reference numbers denote like method steps and/or system components, respectively, and in which:

FIGS. 11-19 are eye diagrams of simulation results utilizing the systems and methods of the present invention.

DETAILED DESCRIPTION OF THE INVENTION

In various exemplary embodiments, the present invention relates to polarization diversity receiver systems and methods with polarization mode dispersion mitigation through processing. Specifically, the present invention includes a direct-detection receiver system that removes the requirement for a LO and an ADC thereby improving power, size, and cost over existing solutions, while at the same time allowing sufficient electronic processing to mitigate PMD impairment. The present invention can be realized in a processing block in CMOS technology front-ended with a polarization diversity receiver utilizing a 90 deg. Optical hybrid. In the various exemplary embodiments and simulation results described herein, reference is made to a 40 Gbps data rate with a return-to-zero differential quadrature phase shift keying (RZ-DQPSK) modulation format as an illustrative example. Those of ordinary skill in the art will recognize the systems and methods of the present invention can be utilized with other data rates (e.g., 10 G, 100 G, etc.) and other modulation formats (e.g., DPSK, NRZ, RZ, etc.).

Figure 1:
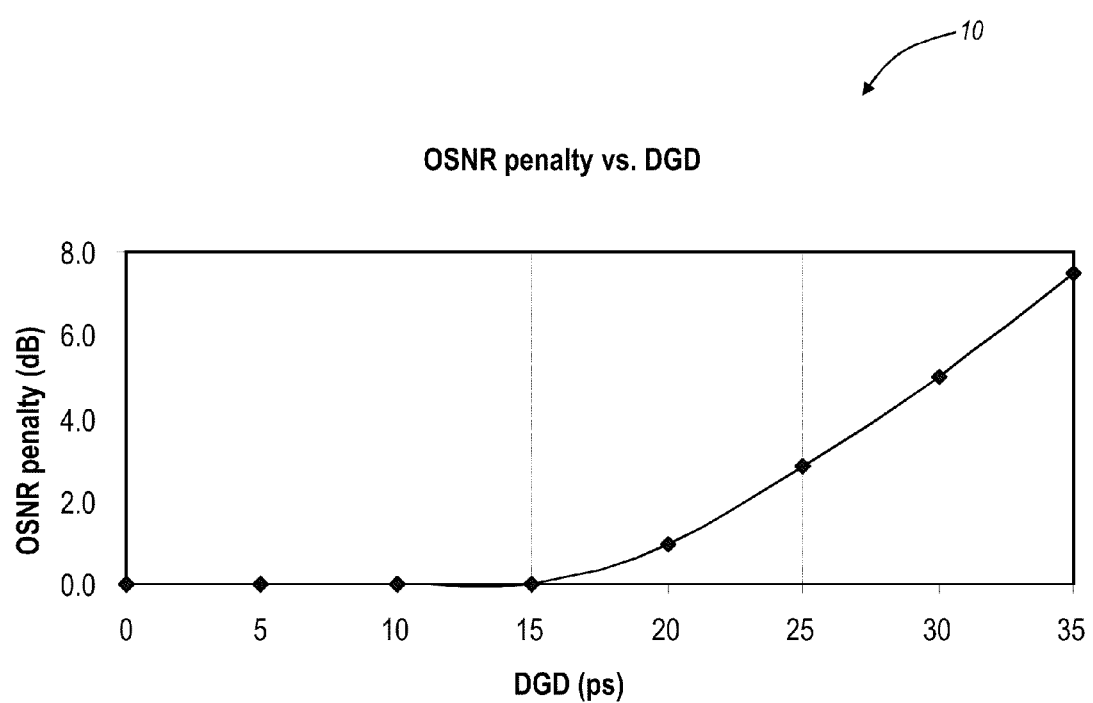
FIG. 1 is a graph of optical signal-to-noise ratio (OSNR) penalty versus differential group delay (DGD) illustrating intrinsic 40 G RZ-DQPSK tolerance to PMD.

Referring to FIG. 1, a graph 10 illustrates optical signal-to-noise ratio (OSNR) penalty versus differential group delay (DGD) to illustrate intrinsic 40 G RZ-DQPSK tolerance to PMD. The measured performance, as plotted in the graph 10, indicates approximately 1 dB OSNR penalty for an instantaneous DGD of approximately 20 ps. This corresponds to a tolerable mean DGD of approximately 6 ps for the combined fiber plant and equipment. A typical moderate to bad PMD fiber may have a PMD coefficient of approximately 0.3 ps/√km, which would correspond a PMD-limited reach of $(6/0.3)^2$ or approximately 400 km. Considering that typical Long-Haul network demand distances are approximately 1500 km, such low reach is clearly insufficient.

Currently, the most promising electrical approach to improve the PMD tolerance of high data rate signals has been focused on using a Coherent receiver, with Digital Signal post-processing. As noted previously, Digitally-Implemented coherent receivers suffer from substantial processing complexity, and very high power consumption, which correspondingly limits possible size reductions. A further problem with Coherent receivers is their technological limitation of Analog-Digital converters (ADC). The ADC sampling rate is ~2× the Baud rate of the signal. So far, Baud rate reduction had to be achieved via both QPSK coding and Polarization Multiplexing, to bring Baud rate within performance window achievable with ADC technology. For example, 40 G coherent receivers are implemented as Polarization Multiplexed QPSK formats, with ~10 GBaud rate, requiring ~20 Gsample/s ADCs.

Figure 2:
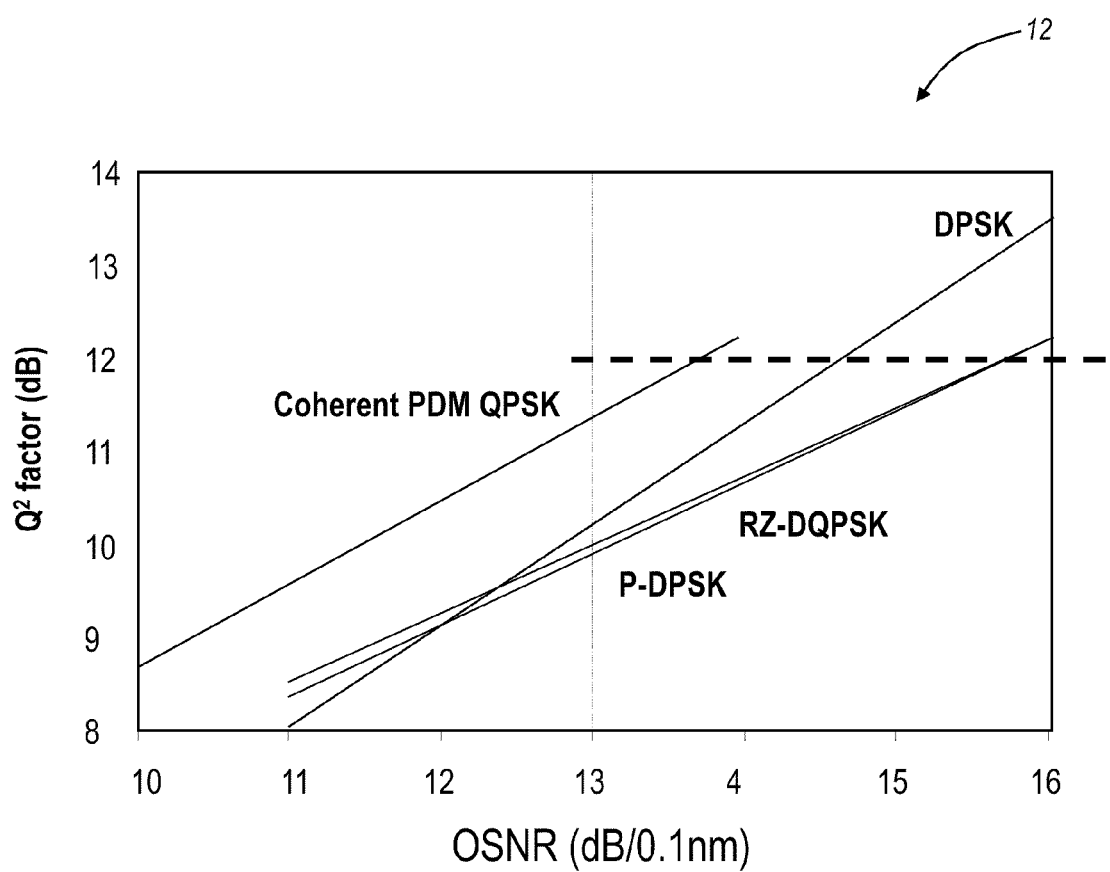
FIGS. 2-5 are graphs illustrating performance comparisons between Polarization Multiplexed QPSK, P-DPSK, and RZ-DQPSK.
Figure 3:
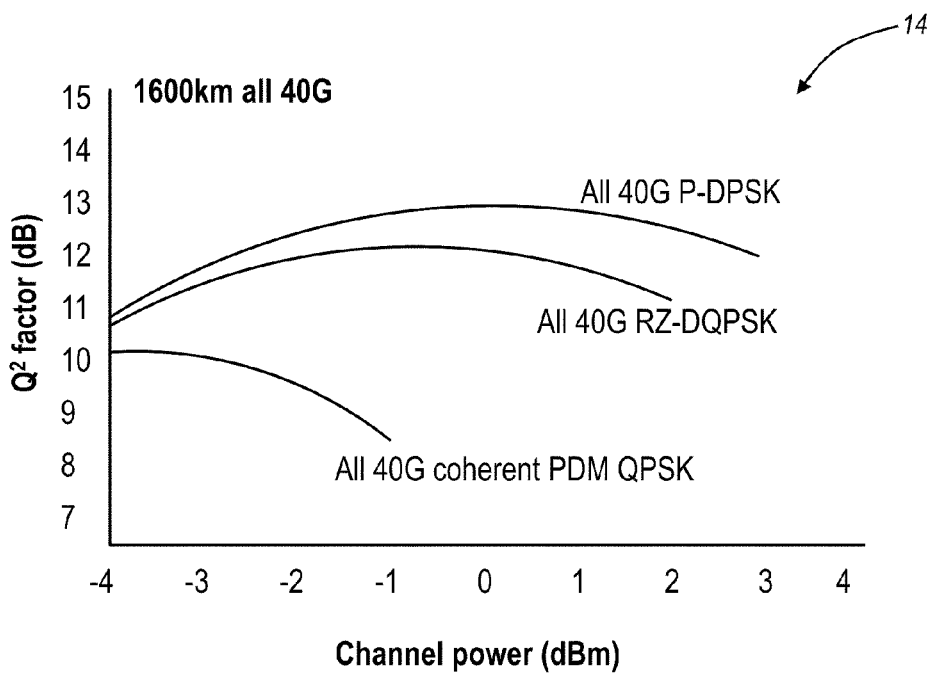
Figure 4:
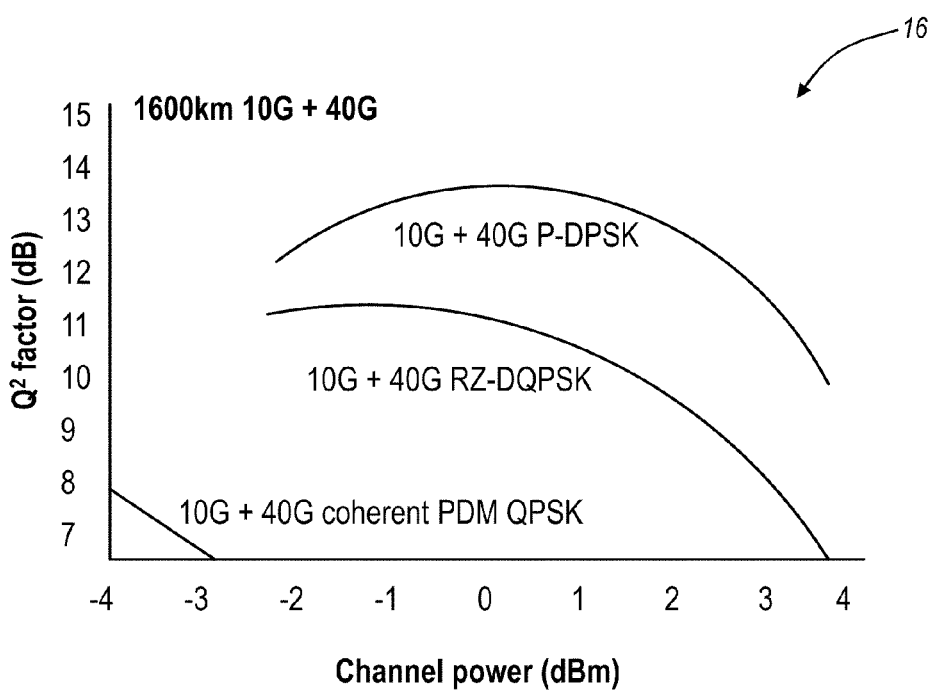
Figure 5:
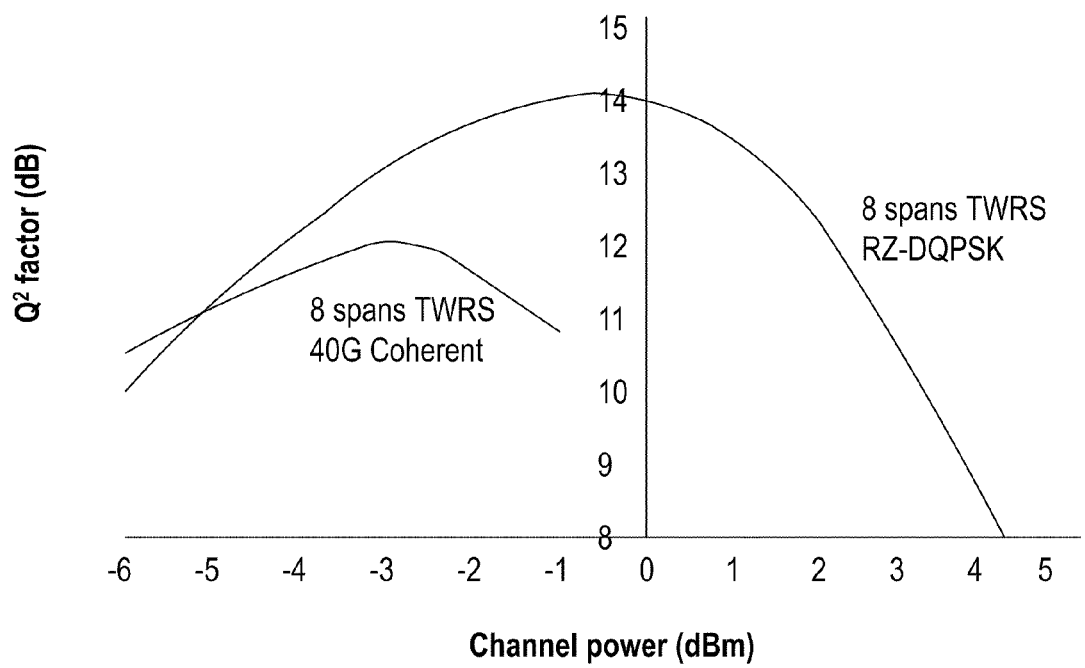

Referring to FIGS. 2-5, graphs 12, 14, 16, 18 illustrate performance comparisons between Polarization Multiplexed QPSK, P-DPSK, and RZ-DQPSK. Polarization Multiplexing of coherent formats induces a substantial penalty to signal propagation in nonlinear regime, as is typically observed for Long-Haul fiber-optic systems. Even coherent gain is not sufficient to overcome the associated penalty. For example, measurements shown below are extracted from a recent work by Chartlet, et al. OFC 2009, paper JWA40. FIG. 2 illustrates the graph 12 which is a plot showing back-back performance measurements of selected formats, and does indeed show the expected Coherent gain benefit relative to direct detection formats. However, once these are propagated over non-dispersion shifted fiber (NDSF) fiber at 50 GHz channel spacing, an immediate and substantial reduction in relative performance associated with Coherent Polarization-Multiplexed QPSK format is observed. This is illustrated in the graph 14 with 1600 km using all 40 G channels and in the graph 16 with 1600 km using a combination of 10 G and 40 G channels. The conclusion is that RZ-DQPSK format can reach ~1600 km, while Coherent PM-QPSK format falls far short of this mark, with most penalty associated with XPM induced noise. An even worse performance is observed on lower-dispersion fibers, such as Truewave reduced slope (TWRS), which are known to induce higher XPM penalties. Nelson, et al. reported measurements of 50 GHz spaced 40 G Coherent PM-QPSK format propagation that could only reach ~800 km with industrial margins. At the same time, RZ-DQPSK is shown to achieve much better performance at higher optical powers. Therefore, it would be highly beneficial to design an approach that would combine both the simplicity of direct detection receivers with high PMD tolerance.

Figure 6:
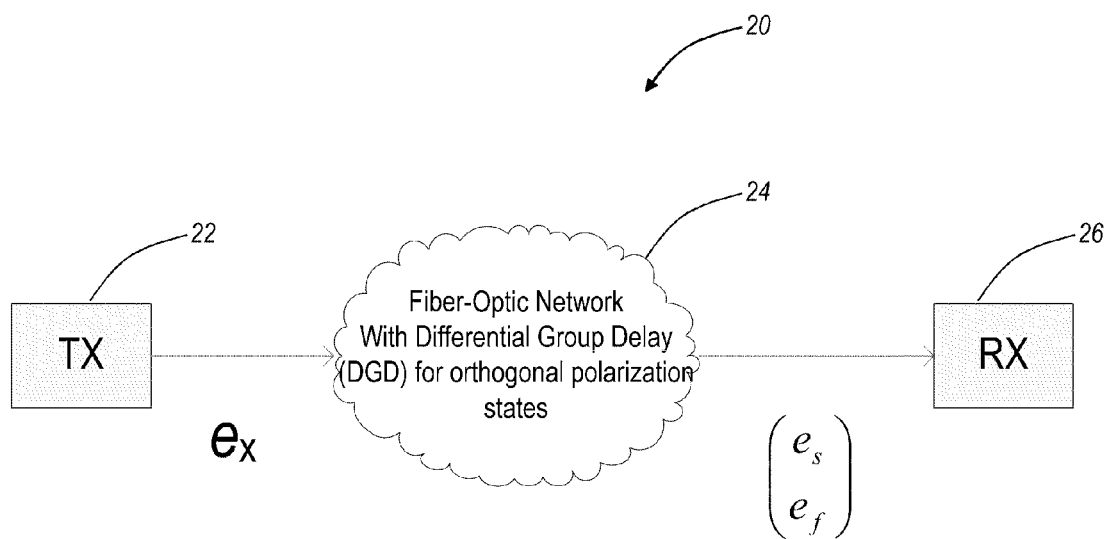
FIG. 6 is a diagram of a fiber-optic system 20 according to an exemplary embodiment of the present invention.

Referring to FIG. 6, a fiber-optic system 20 is illustrated as an exemplary model. The typical fiber-optic system 20 includes a transmitter (TX) 22 that generates a modulated optical field, $e_x$. This modulation can be one of a wide variety of formats such as ASK, PSK, QPSK, etc., and may be done at any one of various data rates such as 10 Gbps, 40 Gbps, 100 Gbps, etc. Polarization Mode Dispersion (PMD) that is present in various system optical components and in the optical transmission fiber itself (represented collectively as fiber-optic network 24) separates the incoming signal $e_x$ into two substantially orthogonal components $e_s$ and $e_f$ and induces a relative differential group delay (DGD) τ between them. As the network 24 undergoes thermal and mechanical fluctuations, the fractional separation as well as the time delay undergoes continuous evolution. It is the job of a receiver (RX) 26 to detect the incoming optical signal and properly reconstruct the transmitted signal $e_x$ for detection. In the present invention, the basic approach is developed around polarization diversity receiver allowing access to both polarizations, and a 90° optical hybrid allowing access to both I and Q components of the output electric signal.

Figure 7:
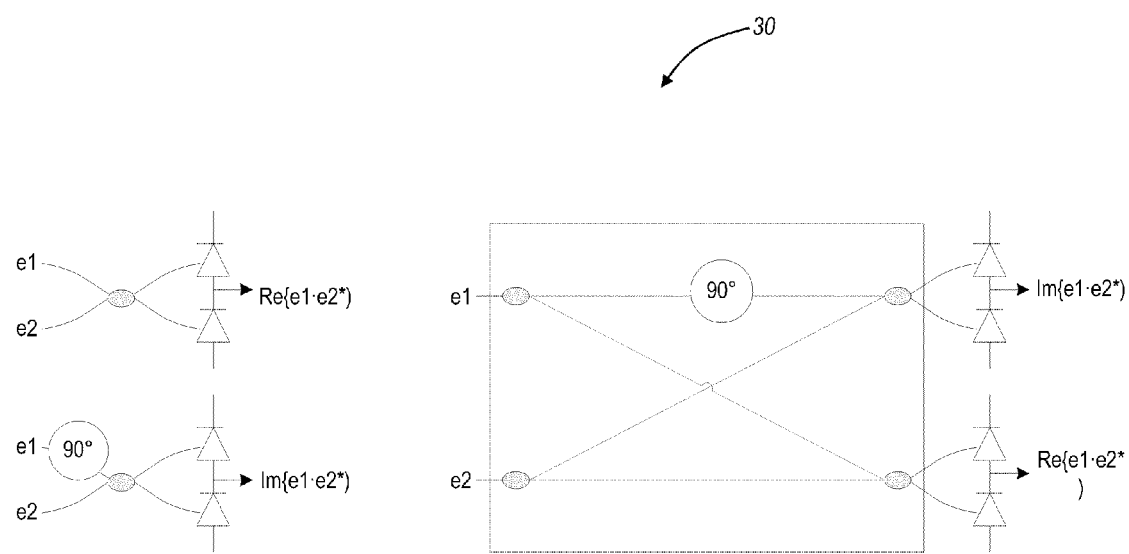
FIG. 7 is a diagram of an optical receiver building block according to an exemplary embodiment of the present invention.

Referring to FIG. 7, a receiver building block 30 is illustrated according to an exemplary embodiment of the present invention. The receiver building block 30 is designed around a 90° optical hybrid. This hybrid provides outputs that represent a complex-number result of the product for arbitrary time-domain input electric fields. Electric fields $e_1$ and $e_2$ are required to have same polarization in order to produce the indicated output. In this notation, '*' sign implies a complex conjugate operation. The receiver building block 30 illustrates the basic math for the optical 90 deg. hybrid, which allows a measurement of a complex product of two optical fields. The optical fields can be anything, and do not have to be any specific modulation format (i.e. DPSK).

Figure 8:
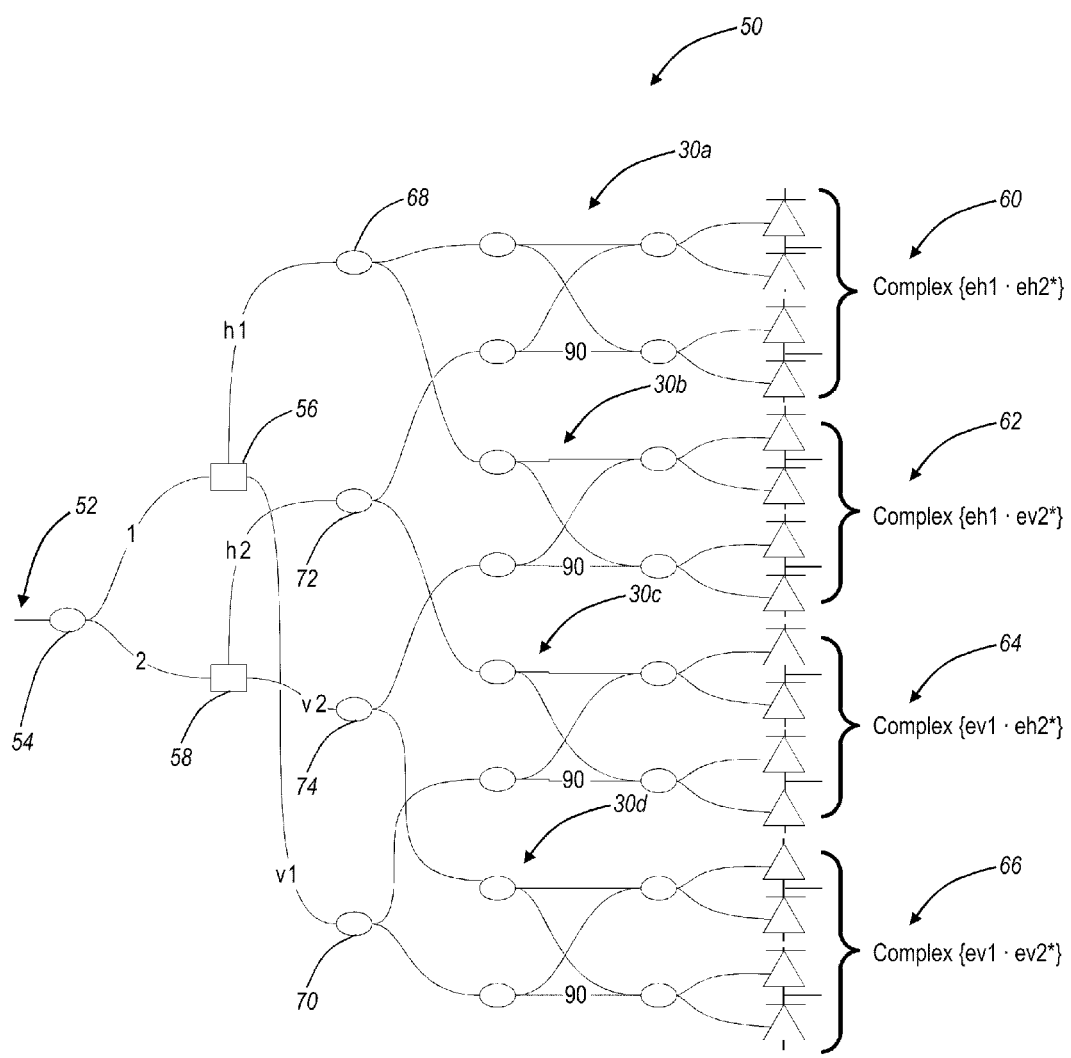
FIG. 8 is a polarization diversity receiver for PMD mitigation according to an exemplary embodiment of the present invention.
Figure 9:
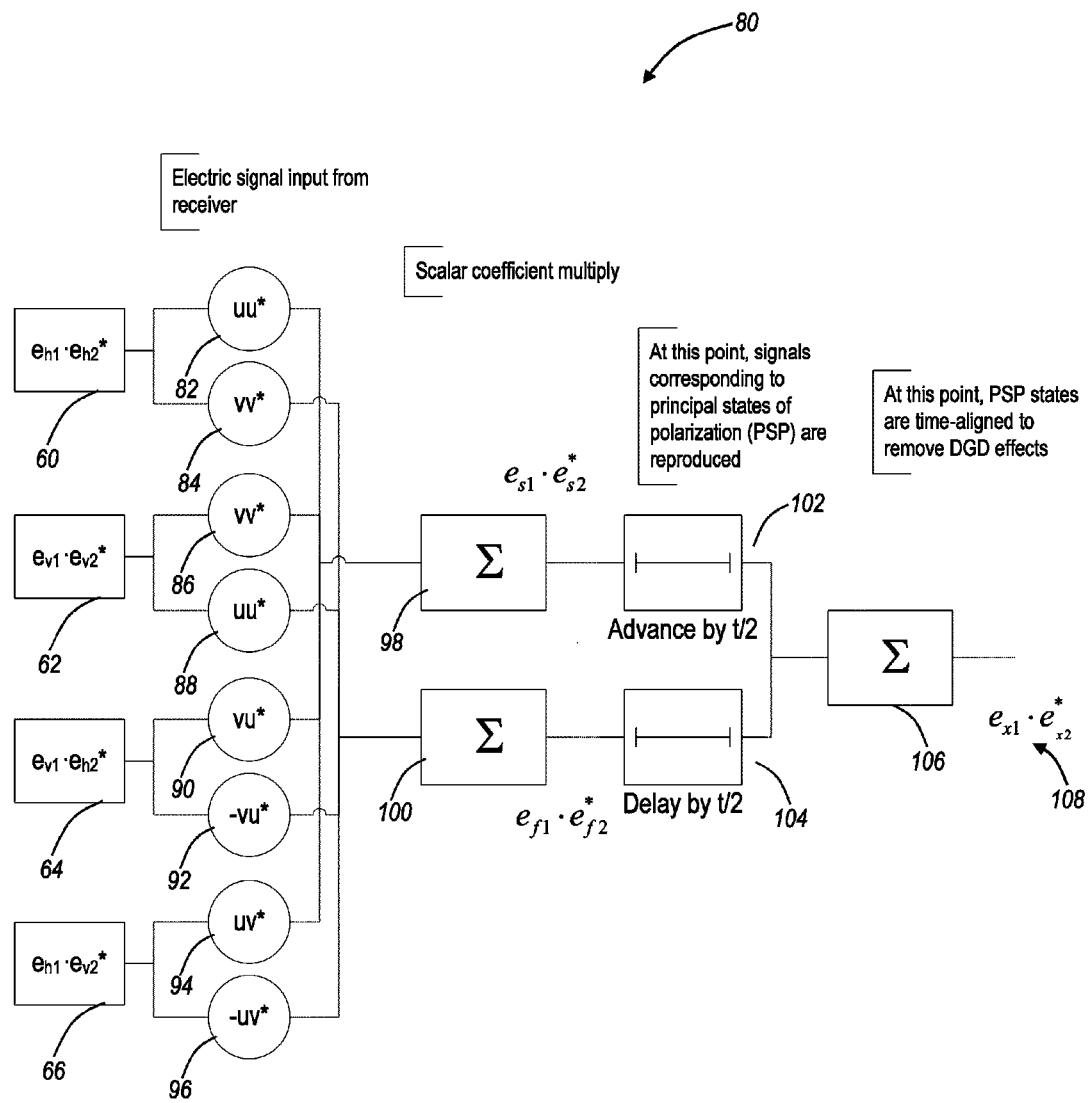
FIG. 9 is a diagram of a processing block for implementing PMD mitigation according to an exemplary embodiment of the present invention.

Referring to FIG. 8, a polarization diversity receiver 50 is illustrated for PMD mitigation according to an exemplary embodiment of the present invention. As described herein, the polarization diversity receiver 50 can apply to any modulation format or bit rate, i.e. it does not have to be specific for DQPSK. The receiver 50 receives an input optical field 52 with arbitrary polarization, and a splitter 54 makes two copies of the input optical field 52 (labeled as '1' and '2'). The signals '1' and '2' are each provided to polarization beam splitters (PBS) 56, 58 to separate the incoming arbitrarily polarized signal, i.e. the optical field 52, into orthogonal polarizations labeled as 'h' and 'v'—i.e., 'h1', 'h2', 'v1', and 'v2' to represent the orthogonal polarizations of signals '1' and '2'. The receiver 50 includes four implementations of the receiver building block 30, labeled as blocks 30a, 30b, 30c, 30d. The block 30a forms a complex signal $(e_{h1} \cdot e^*_{h2})$ 60, the block 30b forms a complex signal $(e_{h1} \cdot e^*_{v2})$ 62, the block 30c forms a complex signal $(e_{v1} \cdot e^*_{h2})$ 64, and the block 30d forms a complex signal $(e_{v1} \cdot e^*_{v2})$ 66. From the PBS 56, the 'h1' signal is input to a splitter 68 that inputs the 'h1' signal to the blocks 30a, 30b. The 'v1' signal is input to a splitter 70 that inputs the 'v1' signal to the blocks 30c, 30d. From the PBS 58, the 'h2' signal is input to a splitter 72 that inputs the 'h2' signal to the blocks 30a, 30c. The 'v2' signal is input to a splitter 74 that inputs the 'v2' signal to the blocks 30b, 30d. Accordingly, polarization terms are combined to provide both direct polarization terms, as well as cross-polarization terms that are subsequently provided to a processing block 80 (FIG. 9). The optical portion of the receiver is four times more complex than conventional single-polarization RZ-DQPSK, and two times more complex than coherent PM-QPSK.

The outputs are complex products $(e_{h1} \cdot e^*_{h2})$ 60 and $(e_{v1} \cdot e^*_{v2})$ 66 for same-polarization terms, and $(e_{h1} \cdot e^*_{v2})$ 62 and $(e_{v1} \cdot e^*_{h2})$ 64 for cross-polarization terms. These inputs can be mapped to polarizations associated with PMD Principal States of Polarization (SOP), denoted as Slow and Fast states, with corresponding time-domain E-field $e_s$ and $e_f$. This mapping can be performed based on the following equations relating $e_s$ and $e_f$ to the signals 60, 62, 64, 66.

$$\begin{pmatrix} e_s \\ e_f \end{pmatrix} = \begin{pmatrix} u & v \\ -v^* & u^* \end{pmatrix} \begin{pmatrix} e_h \\ e_v \end{pmatrix} \quad (1)$$

$$e_{s1} \cdot e_{s2}^* = (ue_{h1} + ve_{v1}) \cdot (u^* e_{h2}^* + v^* e_{v2}^*) \quad (2)$$

$$e_{s1} \cdot e_{s2}^* = uu^* e_{h1} e_{h2}^* + vv^* e_{v1} e_{v2}^* + uv^* e_{h1} e_{v2}^* + vu^* e_{v1} e_{h2}^*$$

$$e_{f1} \cdot e_{f2}^* = vv^* e_{h1} e_{h2}^* + uu^* e_{v1} e_{v2}^* - uv^* e_{h1} e_{v2}^* - vu^* e_{v1} e_{h2}^*$$

The above equations have four coefficients uu, vv, uv and vu which can be determined via dynamic adaptation using a conventional Least Mean Squared (LMS) algorithm. The LMS algorithm determines the four coefficients uu, vv, uv and vu based on the least mean squares of the error signal (difference between the desired and the actual signal). The electric E-field products are signal inputs derived from the optical front-end, i.e. the signals 60, 62, 64, 66. It should be noted that there is a correspondence between coefficients for Slow and Fast signals in an ideal case, but Polarization Dependent Loss (PDL) will introduce a perturbation requiring separate optimization. Subsequent to the recovery of $(e_{s1} \cdot e_{s2})$ and $(e_{f1} \cdot e_{f2})$, a simple relative delay can be applied corresponding to the instantaneous DGD τ at that particular moment, with Slow component advanced and Fast component delayed by τ/2. Finally, the transmitted signal is recovered and demodulated using a simple summation, as is appropriate for a single-polarization input signal, based on the following equation.

$$e_{x1} \cdot e_{x2}^* = (e_{s1} \cdot e_{s2}^*) \otimes \delta(t+\tau/2) + (e_{f1} \cdot e_{f2}^*) \otimes \delta(t-\tau/2) \quad (3)$$

Referring to FIG. 9, the processing block 80 is illustrated for implementing PMD mitigation according to an exemplary embodiment of the present invention. Collectively, the processing block 80 implements the functions in equations (1), (2), and (3) above. The processing block 80 receives the electrical signals 60, 62, 64, 66 from the polarization diversity receiver 50, and then performs a scalar coefficient multiplication with the four coefficients uu, vv, uv and vu. Specifically, the signal 60 is scaled by coefficient multiplexers uu* 82 and *v* 84, the signal 62 is scaled by coefficient multiplexers vv* 86 and uu* 88, the signal 64 is scaled by coefficient multiplexers vu* 90 and −vu* 92, and the signal 66 is scaled by coefficient multiplexers uv* 94 and −uv* 96, where '*' sign implies a complex conjugate operation. Outputs from the coefficient multipliers uu* 82, vv* 86, vu* 90, and uv* 94 are input into a summing block 98, and outputs from the coefficient multipliers vv* 84, uu* 88, −vu* 92, and −uv* 96 are input into a summing block 100. The summing blocks 98, 100 are configured to provide a sum of all the input electrical signals. Outputs from the summing blocks 98, 100 represent reproduced electrical signals corresponding to the directly-detected principal states of polarization (PSP). Specifically, the output from the summing block 98 represents $e_{s1} \cdot e_{s2}^*$ and the output from the summing block 100 represents $e_{f1} \cdot e_{f2}^*$. As described above, subsequent to the recovery of $(e_{s1} \cdot e_{s2}^*)$ and $(e_{f1} \cdot e_{f2}^*)$, a simple relative delay can be applied corresponding to the instantaneous DGD τ at that particular moment. This function is provided by time shifters 102, 104. The time shifter 102 advances $e_{s1} \cdot e_{s2}^*$ by τ/2, and the time shifter 104 delays $e_{f1} \cdot e_{f2}^*$ by τ/2. The outputs of the time shifters 102, 104 have PSP states that are time-aligned to remove DGD effects. Finally, the outputs of the time shifters 102, 104 are input into a summing block 106 that adds these outputs to produce $e_{x1} \cdot e_{x2}^*$ 108.

There are several key advantages and benefits that differentiate this approach from existing implementations. These are enumerated below. They key advantage is an ability to scale the receiver to much higher levels of low-power integration in CMOS. Specifically, implementation of the processing block 80 is achievable in current CMOS technology. Both digital signal processors (DSP) and analog-to-digital converters (ADC) are eliminated based on the present invention, resulting in much simpler and low-power circuitry. Also, a simple one-tap analog filter only is needed for polarization demultiplexing, and a simple CMOS-based variable delay stage (i.e., the time shifters 102, 104) is needed for subsequent PMD compensation. Minimal power consumption will allow this approach to be implemented in highly integrated, multi-channel modules. Thus, both low cost and substantial system size reduction can be achieved. Further, other benefits can be realized since a Local Oscillator laser is not required. A couple of things also to note for the processing block 80 include the processing block 80 is applicable to both ASK and DxPSK formats. Some formats may only need electrical signals corresponding to Re{ } electrical outputs, i.e. I-phase. Second, one arm of the input can include a delay stage to allow for DxPSK format differential detection, i.e. signal '2' of FIG. 8.

Figure 10:
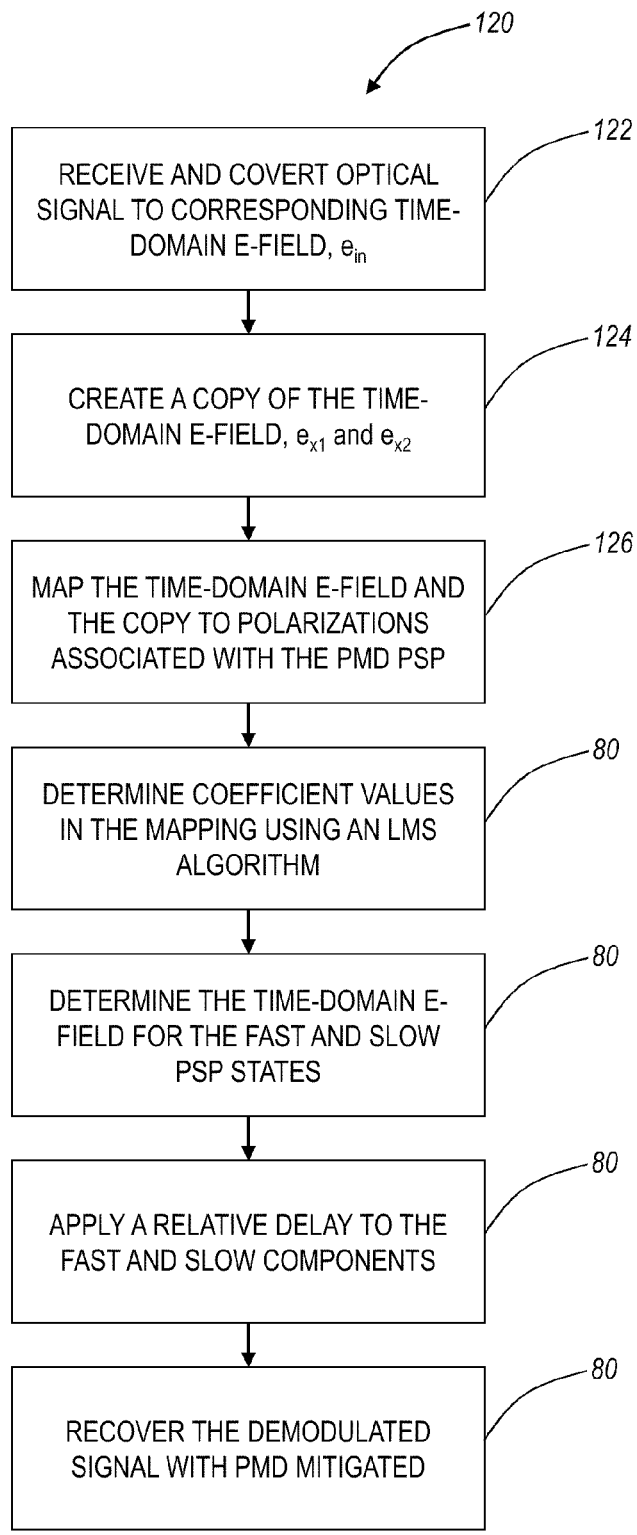
FIG. 10 is a flowchart of a polarization diversity receiver process with PMD mitigation according to an exemplary embodiment of the present invention.

Referring to FIG. 10, a flowchart illustrates a polarization diversity receiver process 120 with PMD mitigation according to an exemplary embodiment of the present invention. The process 120 begins with receiving and converting an optical signal to a corresponding time-domain e-field, $e_{in}$ (step 122). The e-field is copied such that there are two signals, $e_{in1}$ and $e_{in2}$ (step 124). These signals are mapped to polarizations associated with the PMD PSP (step 126). Coefficient values in the mapping are determined utilizing an LMS algorithm (step 128). With the coefficients, the time-dome e-fields are determined for the fast and slow PSP states (step 130). A relative delay is introduces with respect to each of the PSP states with the fast state delayed by τ/2 (with τ being the instantaneous DGD) and the slow state is advanced by τ/2 (step 132). Finally, the demodulated signal is recovered with the PMD mitigated by summing the fast and slow states (step 134).

Figure 11:
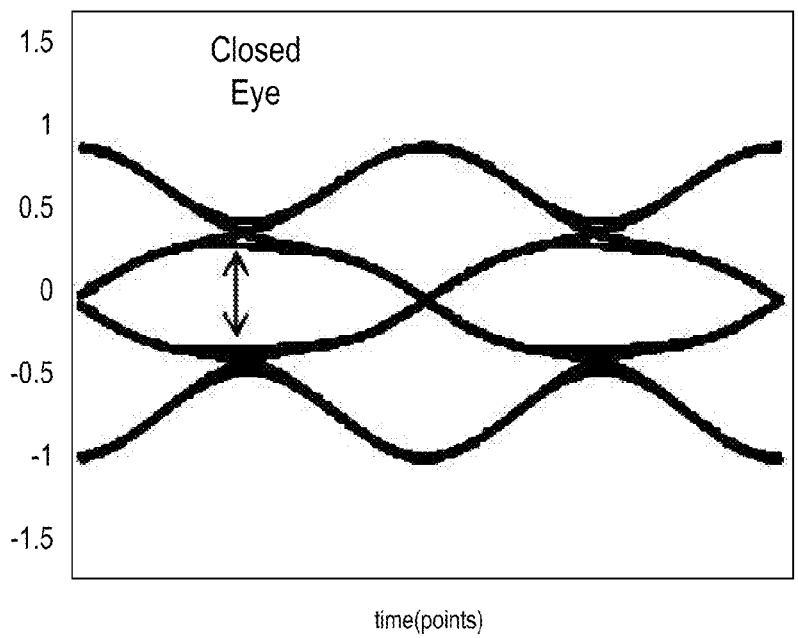
Figure 12:
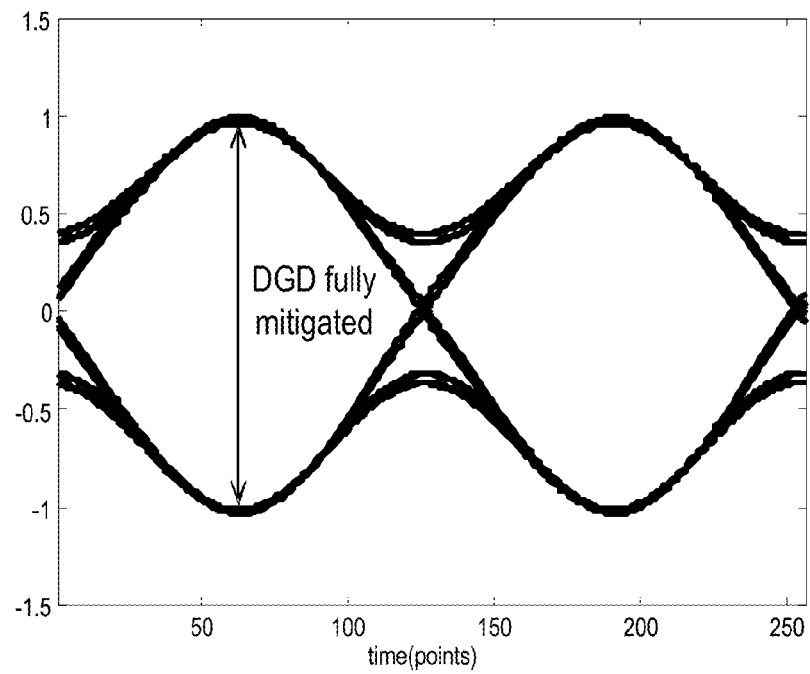
Figure 13:
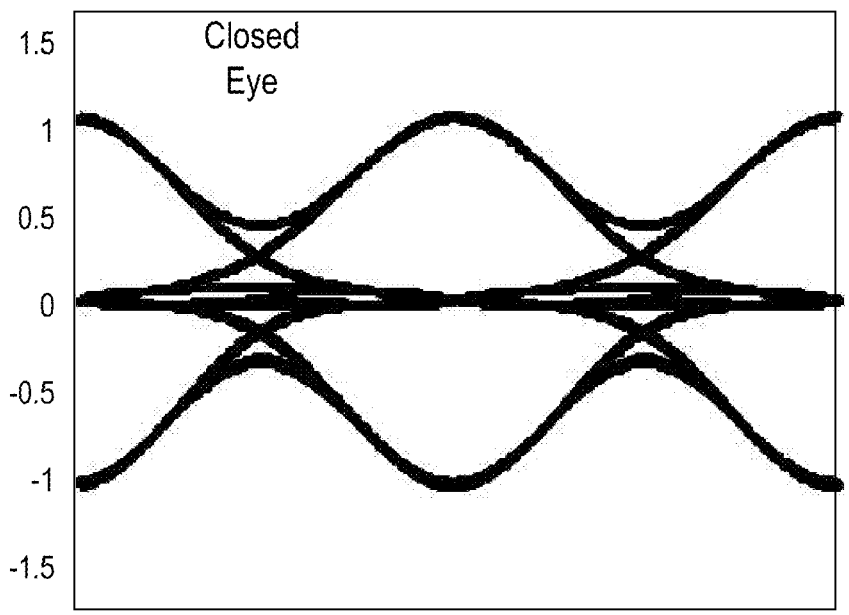
Figure 14:
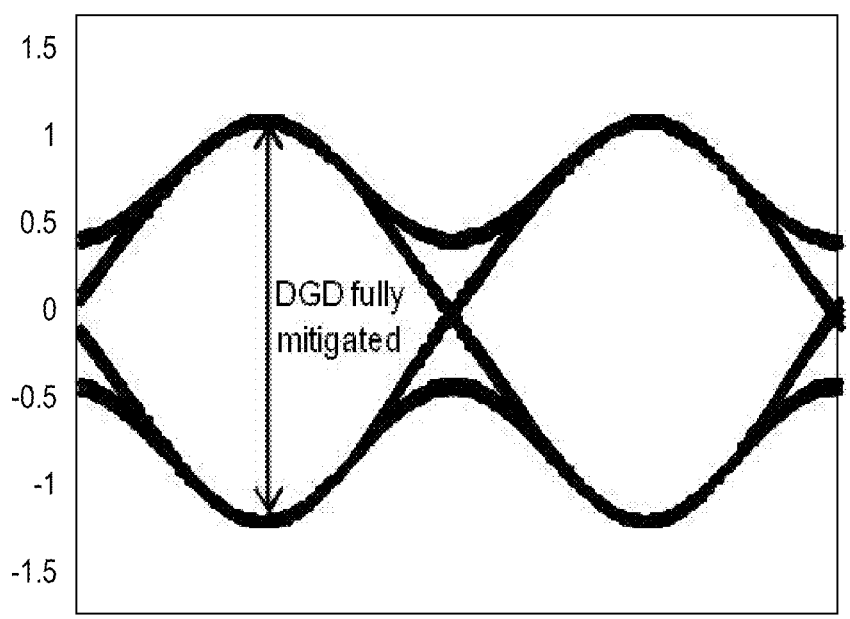

Referring to FIGS. 11-19, several eye diagrams are illustrated of simulation results utilizing the systems and methods of the present invention. Each of the simulation results includes a 44 Gbps RZ-DQPSK data formatted signal for illustration purposes. FIG. 11 illustrates an eye diagram with a single DGD=35 ps element at a 45° angle thereby showing a closed eye. FIG. 12 illustrates an eye diagram following electrical processing on the signal of FIG. 11 using the systems and methods of the present invention thereby showing the DGD is completely mitigated. FIG. 13 illustrates an eye diagram with a single DGD=44 ps element at a 45° angle thereby showing a closed eye. At a DGD=44 ps, this represents a full-bit period of delay. FIG. 14 illustrates an eye diagram following electrical processing on the signal of FIG. 13 using the systems and methods of the present invention thereby showing the DGD is completely mitigated.

A more realistic case for modeling PMD is to use multiple cascaded incremental DGD segments with random relative angular orientations. Such an arrangement is more representative of an actual transmission system, and also introduces higher order effects into the signal as illustrated in FIG. 15. FIG. 15 illustrates an eye diagram after 25 segments with 4 ps DGD and random angle orientations. This result is about 35 ps of DGD between PSP states. FIG. 16 illustrates an eye diagram following electrical processing on the signal of FIG. 15 using the systems and methods of the present invention thereby showing the DGD is completely mitigated. As shown in FIG. 16, PMD is observed to be well compensated, with some residual higher-order effects.

Figure 17:
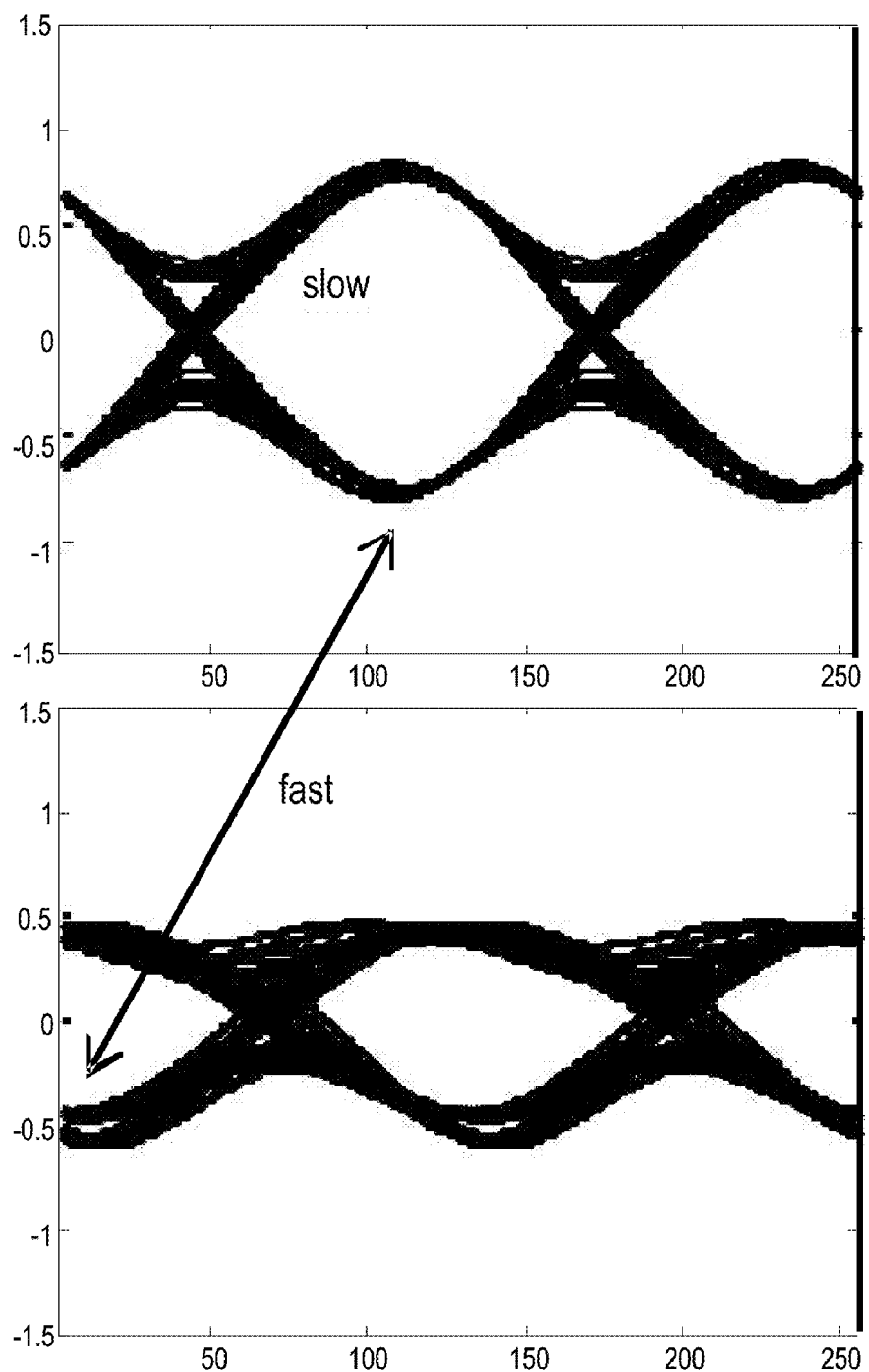

It is interesting to look at individual Slow and Fast components of the signal of FIG. 15, which are shown in FIG. 17. The indicated 35 ps relative delay can be observed in the Eye diagrams. Note, the eye diagrams in FIGS. 12-17 all include signals with high optical signal-to-noise ratios (OSNR). In FIG. 18, the signal from FIG. 15 is loaded with approximately 17 dB of amplified stimulated emission (ASE) noise. In FIG. 19, it is observed that the implemented LMS algorithm and electrical processing still provides robust convergence, and mitigates PMD as required.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A receiver system, comprising:
a polarization diversity receiver configured to provide full electric field capture of a received optical signal;
an electrical processing block configured to receive the full electric field from the polarization diversity receiver and to perform polarization mode dispersion (PMD) mitigation by mapping polarizations associated with PMD Principal States of Polarization with a corresponding time-domain electric field, wherein the polarizations are denoted as a slow state and a fast state;
a first variable delay configured to advance an output of the electrical processing block associated with the slow state responsive to instantaneous differential group delay; and
a second variable delay configured to delay an output of the electrical processing block associated with the fast state responsive to the instantaneous differential group delay.

2. The receiver system of claim 1, further comprising:
a summation block configured to combine outputs from the first variable delay and the second variable delay.

3. The receiver system of claim 2, wherein the first variable delay, the second variable delay, and the summation block are located in the electrical processing block, and wherein the electrical processing block comprises a complementary metal oxide semiconductor.

4. The receiver system of claim 1, wherein the receiver system operates without a local oscillator and without an analog-to-digital converter.

5. The receiver system of claim 1, wherein the electrical processing block executes a Least Mean Squared algorithm to determine coefficients associated with the mapping of polarizations, and to multiply inputs from the polarization diversity receiver by the coefficients.

6. The receiver system of claim 1, wherein the polarization diversity receiver receives an input optical field with arbitrary polarization, and wherein the polarization diversity receiver comprises a splitter that makes two copies of the input optical field and a 90° optical hybrid.

7. The receiver system of claim 6, wherein polarization terms of the input optical field are combined to provide both direct polarization terms and cross-polarization terms, and where the direct polarization terms and the cross-polarization terms are provided to the electrical processing block.

8. The receiver system of claim 6, wherein the input optical field comprises multiplexed signals on a horizontal polarization and a vertical polarization, and wherein the polarization diversity receiver comprises a polarization beam splitter configured to separate the horizontal polarization and the vertical polarization.

9. The receiver system of claim 8, wherein mapping for the slow state and the fast state is performed as:

$$\begin{pmatrix} e_s \\ e_f \end{pmatrix} = \begin{pmatrix} u & v \\ -v^* & u^* \end{pmatrix} \begin{pmatrix} e_h \\ e_v \end{pmatrix}$$

$$e_{s1} \cdot e_{s2}^* = (ue_{h1} + ve_{v1}) \cdot (u^* e_{h2}^* + v^* e_{v2}^*)$$

$$e_{s1} \cdot e_{s2}^* = uu^* e_{h1} e_{h2}^* + vv^* e_{v1} e_{v2}^* + uv^* e_{h1} e_{v2}^* + vu^* e_{v1} e_{h2}^*$$

$$e_{f1} \cdot e_{f2}^* = vv^* e_{h1} e_{h2}^* + uu^* e_{v1} e_{v2}^* - uv^* e_{h1} e_{v2}^* - vu^* e_{v1} e_{h2}^*$$

where $e_s$ corresponds to the slow state, $e_f$ corresponds to the fast state, $e_{s1}$ and $e_{s2}$ are identical copies of $e_s$, $e_{f1}$ and $e_{f2}$ are identical copies of $e_f$, * denotes a complex conjugate, and corresponds uu, vv, uv and vu are coefficients determined via dynamic adaptation using a Least Mean Squared algorithm.

10. The receiver system of claim 9, wherein the input optical field is recovered with polarization mode dispersion mitigation and demodulated using:

$$e_{x1} \cdot e_{x2}^* = (e_{s1} \cdot e_{s2}^*) \otimes \delta(t+\tau/2) + (e_{f1} \cdot e_{f2}^*) \otimes \delta(t-\tau/2).$$

11. A method, comprising:
receiving an optical signal time-domain electric field;
creating a copy of the time-domain electric field;
mapping the time-domain electric field and the copied time-domain electric field to polarizations associated with polarization mode dispersion principal states of polarizations (PSP); and
mitigating the polarization mode dispersion based on the mapping step;
wherein the mitigating step comprises applying a relative delay between a time-domain electric field for a fast PSP state and for a slow PSP state based on instantaneous differential group delay.

12. The method of claim 11, wherein the mitigating step comprises:
determining coefficient values in the mapping step via dynamic adaptation using a Least Mean Squared algorithm; and
determining a time-domain electric field for the fast PSP state and for the slow PSP state.

13. The method of claim 12, wherein the mitigating step further comprises:
applying a relative delay to the time-domain electric field for an output associated with the fast PSP state and for an output associated with the slow PSP state based on instantaneous differential group delay; and
recovering the optical signal with mitigated polarization mode dispersion by summing the outputs associated with the relatively delayed fast PSP state and the relatively delayed slow PSP state.

14. A processing block for a receiver, comprising:
circuitry comprising an input and an output;
wherein the input is configured to receive time-domain electric fields corresponding to a received optical signal;
wherein the output is configured to provide a polarization mode dispersion mitigated signal of the received optical signal;
wherein the circuitry is configured to map the received time-domain electric fields to polarizations associated with polarization mode dispersion principal states of polarization;

wherein the polarizations are denoted as a slow state and a fast state; and wherein the circuitry is further configured to:

provide a first variable delay to advance an output associated with the slow state responsive to instantaneous differential group delay; and provide a second variable delay to delay an output associated with the fast state responsive to the instantaneous differential group delay.

15. The processing block of claim 14, wherein the circuitry is further configured to:

sum outputs from the first variable delay and the second variable delay.

16. The processing block of claim 14, wherein the circuitry comprises a complementary metal oxide semiconductor.

17. The processing block of claim 14, wherein the circuitry is utilized in a receiver operating without a local oscillator and without an analog-to-digital converter.

\* \* \* \* \*